(12) United States Patent
Sharma et al.

(10) Patent No.: US 7,711,155 B1
(45) Date of Patent: May 4, 2010

(54) METHOD AND SYSTEM FOR ENHANCING THREE DIMENSIONAL FACE MODELING USING DEMOGRAPHIC CLASSIFICATION

(75) Inventors: Rajeev Sharma, State College, PA (US); Kuntal Sengupta, Melbourne, FL (US)

(73) Assignee: VideoMining Corporation, State College, PA (US)

( * ) Notice: Subject to any disclaimer, the term of this patent is extended or adjusted under 35 U.S.C. 154(b) by 1153 days.

(21) Appl. No.: 10/822,498

(22) Filed: Apr. 12, 2004

Related U.S. Application Data

(60) Provisional application No. 60/462,809, filed on Apr. 14, 2003.

(51) Int. Cl.
*G06K 9/00* (2006.01)
*G06K 9/36* (2006.01)

(52) U.S. Cl. .................. 382/118; 345/419; 345/420; 345/421; 345/422; 345/423; 345/424; 345/426; 345/427; 382/154; 382/285

(58) Field of Classification Search .................. 382/118
See application file for complete search history.

(56) References Cited

U.S. PATENT DOCUMENTS

| | | | | |
|---|---|---|---|---|
| 3,740,466 A * | 6/1973 | Marshall et al. | ............ | 348/154 |
| 5,748,199 A | 5/1998 | Palm | ................ | 345/473 |
| 5,818,959 A | 10/1998 | Webb et al. | ................ | 382/154 |
| 5,850,463 A * | 12/1998 | Horii | ................ | 382/118 |
| 6,016,148 A | 1/2000 | Kang et al. | ................ | 345/622 |
| 6,044,168 A * | 3/2000 | Tuceryan et al. | ............ | 382/118 |
| 6,047,078 A | 4/2000 | Kang | ................ | 382/107 |
| 6,184,926 B1 | 2/2001 | Khosravi et al. | ............ | 348/239 |
| 6,272,231 B1 * | 8/2001 | Maurer et al. | ................ | 382/103 |
| 6,301,370 B1 * | 10/2001 | Steffens et al. | ............ | 382/103 |
| 6,404,900 B1 | 6/2002 | Qian et al. | ................ | 382/103 |
| 6,492,986 B1 | 12/2002 | Metaxas et al. | ............ | 345/420 |
| 6,532,011 B1 * | 3/2003 | Francini et al. | ............ | 345/420 |
| 6,556,196 B1 * | 4/2003 | Blanz et al. | ................ | 345/419 |
| 6,925,438 B2 * | 8/2005 | Mohamed et al. | ........... | 704/276 |
| 6,990,217 B1 * | 1/2006 | Moghaddam et al. | ....... | 382/118 |
| 7,103,211 B1 * | 9/2006 | Medioni et al. | ............ | 382/154 |
| 7,221,809 B2 * | 5/2007 | Geng | ................ | 382/280 |
| 7,257,239 B2 * | 8/2007 | Rowe et al. | ................ | 382/118 |
| 2001/0033675 A1 * | 10/2001 | Maurer et al. | ............ | 382/103 |
| 2003/0063795 A1 * | 4/2003 | Trajkovic et al. | ............ | 382/159 |
| 2003/0108223 A1 * | 6/2003 | Prokoski | ................ | 382/115 |
| 2004/0002931 A1 * | 1/2004 | Platt et al. | ................ | 706/46 |

OTHER PUBLICATIONS

An affine coordinate based algorithm for reprojecting the human face for identification tasks Kuntal Sengupta and Jun Ohya ATR Media Integration and Communications Research Laboratories 2-2 Hikaridai, Seika cho, Soraku gun, Kyoto 619-02, Japan.*

(Continued)

*Primary Examiner*—Brian P Werner
*Assistant Examiner*—Michael Vanchy, Jr.

(57) ABSTRACT

The present invention is a system and method for modeling faces from images captured from a single or a plurality of image capturing systems at different times. The method first determines the demographics of the person being imaged. This demographic classification is then used to select an approximate three dimensional face model from a set of models. Using this initial model and properties of camera projection, the model is adjusted leading to a more accurate face model.

10 Claims, 6 Drawing Sheets

OTHER PUBLICATIONS

"A Unified Learning Framework for Real Time Face Detection and Classification," by Gregory Shakhnarovich, Paul Viola, and Baback Moghaddam.Proceedings of the Fifth IEEE International Conference on Automatic Face and Gesture Recognition. 2002.*

"An affine coordinate based algorithm for reprojecting the human face for identification tasks," Kuntal Sengupta and Jun Ohya. ATR Media Integration and Communications Research Laboratories 2-2 Hikaridai, Seika cho, Soraku gun, Kyoto 619-02, Japan. 1997.*

K. Aizawa and T.S. Huang, Model-Based Image Coding: Advanced Video Coding Techniques for Very Low Bit-Rate Applications, Proceedings IEEE, Aug. 1995, pp. 259-271, vol. 83.

T. Jebara and A. Pentland, Parameterized Structure from Motion for 3D Adaptive Feedback Tracking of Faces, Proceedings CVPR, Jun. 1997, pp. 144-150.

P. Fua and C. Miccio, Animated Heads from Ordinary Images: A Least-Squares Approach, Computer Vision and Image Understanding, Sep. 1999, pp. 247-259, vol. 75, No. 3.

K. Sengupta and P. Burnam, A Curve Fitting Problem and Its Application in Modeling Objects from Images, IEEE Trans. Pattern Analysis and Machine Intelligence, May 2002, pp. 674-686, vol. 24, No. 5.

V. Blanz and T. Vetter, A Morphable Model for the Synthesis of 3D Faces, Proc. Siggraph, 1999, pp. 187-194.

K. Sengupta, P. Lee, and J. Ohya, Face Posture Estimation Using Eigen Analysis on an IBR Database, Pattern Recognition, Jan. 2002, pp. 103-117, vol. 35.

K. Sengupta and CC Ko, Scanning Face Models with Desktop Cameras, IEEE Transactions on Industrial Electronics, Oct. 2001, vol. 48, No. 5.

K. Sengupta and Jun Ohya, An Affine Coordinate Based Algorithm for Reprojecting the Human Face for Identification Tasks, Proc. IEEE International Conference on Image Processing, Nov. 1997, pp. 340-343.

M. Yeasin and Y. Kuniyoshi, Detecting and Tracking Human Face and Eye Using a Space-Variant Vision Sensor and an Active Vision Head, presented at IEEE Conference on Computer Vision and Pattern Recognition (CVPR), 2000.

V. Vapnik and A. Chervonenkis, On the Uniform Convergence of Relative Frequences of Events to Their Probabilities, in Prob. and its Applications, 1971, pp. 264-280, vol. 17, V. N. V. a A. Y.

N. Vapnik, The Nature of Statistical Learning Theory Heidelberg, 1995, DE Springer Verlag.

Y. Yang, An Evaluation of Statistical Approaches to Text Categorization, 1998, Journal on Information Retrieval.

E. Osuna. R. Freund, and F. Giorsi, Support Vector Machines: Training and Applications, MIT Artificial Intelligence Laboratory and Center for Biological and Computational Learning Department of Brain and Cognitive Sciences, Mar. 1997.

C. Burges, "A Tutorial on Support Vector Machines for Pattern Recognition", Data Mining and Knowledge Discovery, vol. 2, pp. 121-167, 1998.

J.C. Platt, Fast Training of SVMs using Sequential Minimal Optimization, in Advances in Kernel Methods—Support Vector Learning, 1998, pp. 185-208, MIT Press, Boston USA.

T. Joachims, Making Large-Scale SVM Learning Practical, in Advances in Kernel Methods—Support Vector Learning, 1999, MIT Press, Boston USA.

A. Mohan, C. Papageorgiou, and T. Poggio, Example-Based Object Detection in Images by Components, IEEE Transactions on Pattern Analysis and Machine Intelligence, 2001, vol. 23(4).

D.D Lee and H.S.Seung, Learning the Parts of Objects by Non-Negative Matrix Factorization, Nature, 1999, pp. 788-791, vol. 401.

D. Jacobs, The Space Requirements of Indexing Under Perspective Projection, IEEE Trans. on Pattern Analysis and Machine Intelligence, 1996, pp. 330-333, vol. 18, No. 3.

E.Osuna, R. Freund, and F. Girosi, Training Support Vector Machines: An Application to Face Detection, Proc. IEEE Conf. Computer Vision and Pattern Recognition, 1997, pp. 130-136.

H. Rowley, S. Baluja, and T. Kanade, Neural Network-Based Face Detection, IEEE Trans. Pattern Analysis and Machine Intelligence, Jan. 1998, pp. 23-38, vol. 20, No. 1.

M.H. Yang, D.J. Kriegman, and N. Ahuja, Detecting Faces in Images: A Survey, IEEE Trans. Pattern Analysis and Machine Intelligence, Jan. 2002, vol. 24, No. 1.

C.H. Lin, and J.L. Wu, Automatic Facial Feature Extraction by Genetic Algorithms, IEEE Transactions on Image Processing, Jun. 1999, pp. 834-845, vol. 8, No. 6.

* cited by examiner

METHOD AND SYSTEM FOR ENHANCING THREE DIMENSIONAL FACE MODELING USING DEMOGRAPHIC CLASSIFICATION

CROSS-REFERENCE TO RELATED APPLICATIONS

This application is entitled to the benefit of Provisional Patent Application Ser. No. 60/462,809, filed Apr. 14, 2003.

FEDERALLY SPONSORED RESEARCH

Not Applicable

SEQUENCE LISTING OR PROGRAM

Not Applicable

BACKGROUND OF THE INVENTION

1. Field of the Invention

The present invention is a system and method for human face modeling from multiple images of the face using demographics classification for an improved model fitting process.

2. Background of the Invention

Three-dimensional (3D) modeling of human faces from intensity images is an important problem in the field of computer vision and graphics. Applications of such an automated system range from virtual teleconferencing to face-based biometrics. In virtual teleconferencing applications, face models of participants are used for rendering scenes at remote sites, with only the need for incremental information to be transmitted at every time instance. Traditional face recognition algorithms are primarily based on the two-dimensional (2D) cues computed from an intensity image. The 2D facial features provide strong cues for recognition. However, it cannot capture the semantics of the face completely, especially the anthropometrical measurements. Typical examples of these would be the relative length of the nose bridge and the width of the eye, the perpendicular distance of the tip of the nose from the plane passing through the eye centers and the face center, etc.

The technique discussed by Aizawa and Huang in "Model-Based Image Coding: Advanced Video Coding Techniques for Very Low Bit-Rate Application," Proceedings IEEE, vol. 83, pp. 259-271, August 1995 adjusts meshes to fit the images from a continuous video sequence. In a surveillance scenario, we may have only the key frames from a single, or a multiple camera system, for specific time instances. Thus the computation of optical flow between consecutive image frames, captured by each of the cameras, will not be possible.

The techniques discussed by Jebara and Pentland in "Parameterized structure from motion for 3D adaptive feedback tracking of faces," Proceedings Computer Vision and Pattern Recognition, pp. 144-150, June 1997 also uses optical flow computed from consecutive frames in a video to compute the model.

Fua and Miccio in "Animated Heads from Ordinary Images: A Least-Squares Approach," Computer Vision and Image Understanding, vol. 75, No. 3, pp. 247-259, September 1999 use a stereo matching based technique for face modeling. Under multiple camera surveillance, the camera system may not be calibrated properly. This is because these cameras can be moved around, whenever required. Thus, the assumption of the knowledge of calibration parameters, especially in stereo-based techniques, breaks down.

U.S. Pat. No. 6,556,196 describe a morphable model technique which require a frontal shots of the face. The single view based modeling approaches works well with cooperative subjects, where the entire frontal view of the face is available. Again, in vieo surveillance, it may be difficult to control the posture of the subject's face.

U.S. Pat. No. 6,016,148 discusses a method of mapping a face image to a 3D model. The 3D model is fixed, and general. No knowledge of the demographics of the person is used, and this mapping can be erroneous, especially while using a generic model for any race or gender.

U.S. Pat. No. 5,748,199 discusses a method of modeling three-dimensional scenes from a video, by using techniques similar to structure from motion. This technique would not be successful if continuous video feed is not provided to the system. Similar modeling technique is discussed in U.S. Pat. No. 6,047,078. U.S. Pat. No. 6,492,986 combines optical flow with deformable models for face modeling. As before, these techniques will not be successful when there is no continuous video stream.

U.S. Pat. No. 5,818,959 discusses a method similar to space curving for generating three-dimensional models from images. Although these images need not be from continuous video sources, they need to be calibrated a-priori. Camera calibration is not a trivial task, especially for portable camera systems.

SUMMARY

The system first utilizes tools for face detection and facial feature detection. The face and feature detection is robust under changes in illumination condition.

Next, the system utilizes Support Vector Machine (SVM) based race and gender classifiers to determine the race and gender of the person in the images. One of the key elements of an SVM based recognition technique is the learning phase. In the learning phase, a few thousand images for males and female faces are collected, and are used as an input for the training of the gender recognition system. Similar training procedure is followed for race classification.

For a given set of face images of the person, the race and gender is determined, and a face model, specific for that sub-class (for example, male-Caucasian is a subclass) is chosen as an approximate face model.

Next, a simple yet effective, 3D mesh adjustment technique based on some of the fundamental results in 3D computer vision was used. Fundamental results for paraperspective camera projection form the foundation of this mesh adjustment technique. Once the facial landmarks are identified across the images, the depth of an arbitrary point in the face mesh is changed continually and reprojected to all views (following paraperspective camera projection properties). The depth value for which a successful match is obtained across views is chosen. This is repeated for a dense set of points on the face.

DRAWINGS

Figures

DETAILED DESCRIPTION OF THE INVENTION

Figure 1:
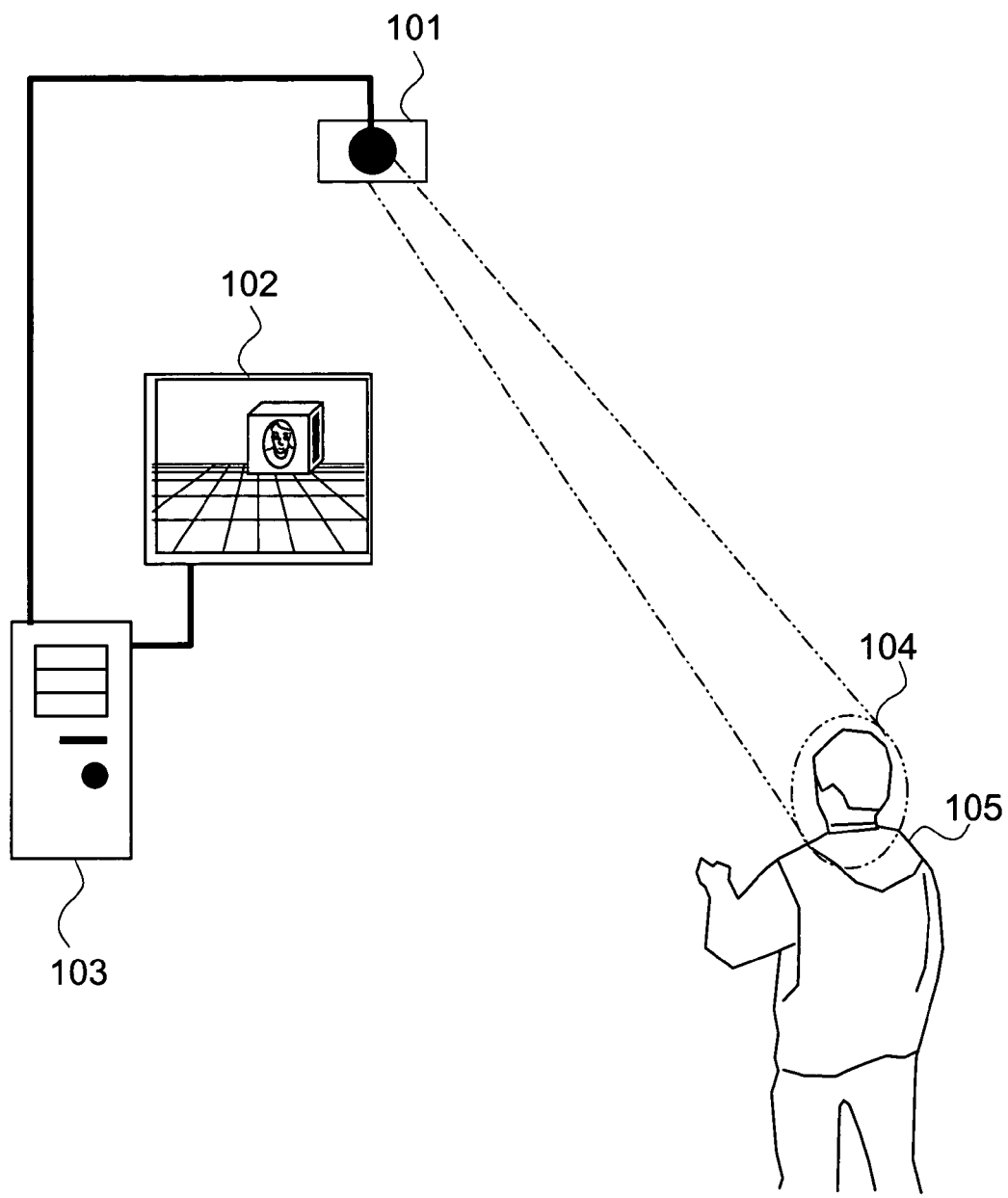
FIG. 1 is an overall view of the preferred system components for the invention.

In the exemplary embodiment shown in FIG. 1, a camera, such as the Sony EVI-D30, and frame grabber, such as the Matrox Meteor II frame grabber, may be used as a means for capturing images 101. A firewire camera, such as the Pyro 1394 web cam by ADS technologies or iBOT FireWire Desktop Video Camera by OrangeMicro, or a USB camera, such as the QuickCam Pro 3000 by Logitech, may be used as the means for capturing images 101. A plurality of such means for capturing images 101 can be used for multiple processing for multiple users 105 in the exemplary embodiment shown in FIG. 1.

Optionally, a means for displaying contents 102 in the invention can be used to render the three-dimensional face model. The means for displaying contents 102 can be any kind of conventionally known displaying device, computer monitor, or closed circuit TV. A large display screen, such as the Sony LCD projection data monitor model number KL-X92000, may be used as the means for displaying contents 102 in the exemplary embodiments.

The processing software and application may be written in a high-level computer programming language, such as C++, and a compiler, such as Microsoft Visual C++, may be used for the compilation in the exemplary embodiment. Face detection software can be used to detect the face region 104.

Figure 2:
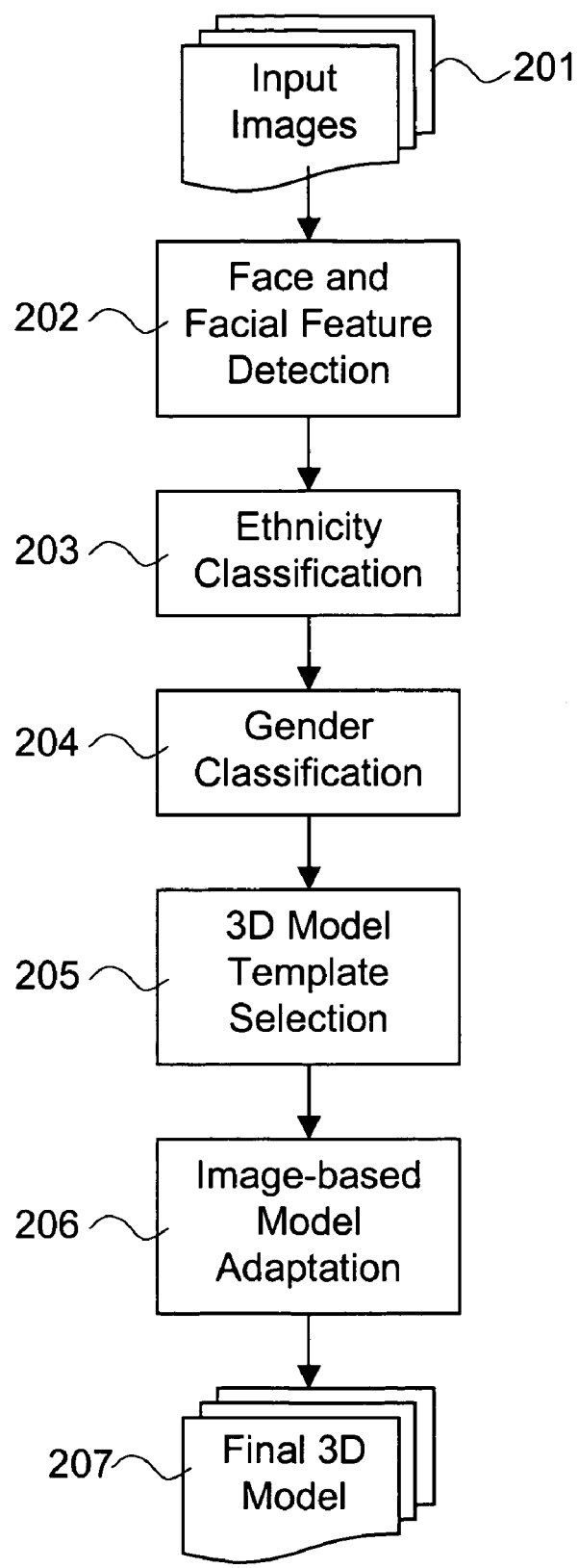
FIG. 2 is the illustration of the different important sub-components in the face modeling system.

In the exemplary embodiment shown in FIG. 2, the system first utilizes tools 202 for face detection and facial feature detection from images 201. For the face detection and facial feature detection, any robust, reliable, and efficient detection method can be used. In U.S. Pat. No. 6,184,926 of Khosravi et al. and U.S. Pat. No. 6,404,900 of Qian et al., the authors disclosed methods for human face detection. In M. N. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment, a neural network based face detector or SVM based face detection method may be used. H. Rowley, S. Baluja, and T. Kanade, "Neural Network-Based Face Detection," IEEE Trans. Pattern Analysis and Machine Intelligence, vol. 20, no. 1, pp. 23-38, January 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130-136, 1997 explains about the SVM based face detection approach in more details. An efficient facial feature detection is described by C. H. Lin, and J. L. Wu., "Automatic Facial Feature Extraction by Genetic Algorithms". IEEE transactions on image processing, volume 8, no. 6, pages 834-845, June 1999.

Next, the system utilizes Support Vector Machine (SVM) based race and gender classifiers, 203 and 204, respectively, to determine the race and gender of the person in the images. One of the key elements of an SVM based recognition technique is the learning phase. In the learning phase, a few thousand images for males and female faces are collected, and are used as an input for the training of the gender recognition system. Similar training procedure is followed for race classification. Examples of demographic classification for gender and ethnicity are described in detail in R. Sharma, L. Walavalkar, and M. Yeasin, "Multi-modal gender classification using support vector machines (SVMs)", U.S. Provisional Patent, 60/330,492, Oct. 16, 2001 and in R. Sharma, S. Mummareddy, and M. Yeasin, "A method and system for automatic classification of ethnicity from images", U.S. patent Ser. No. 10/747,757, Dec. 29, 2003, respectively.

For a given set of face images of the person, the race and gender is determined, and a face model, specific for that sub-class (for example, male-Caucasian is a subclass) is chosen as an approximate face model by the subsystem 205 in the exemplary embodiment shown in FIG. 2.

In the exemplary embodiment shown in FIG. 2, a simple yet effective, 3D mesh adjustment technique 206 based on some of the fundamental results in 3D computer vision was used. Fundamental results for paraperspective camera projection form the foundation of this mesh adjustment technique. The paraperspective camera projection assumption works well for face modeling applications, because the depth variation on the face is not significant compared to its distance from the camera. The final face model 207 is the output of the system.

Figure 3:
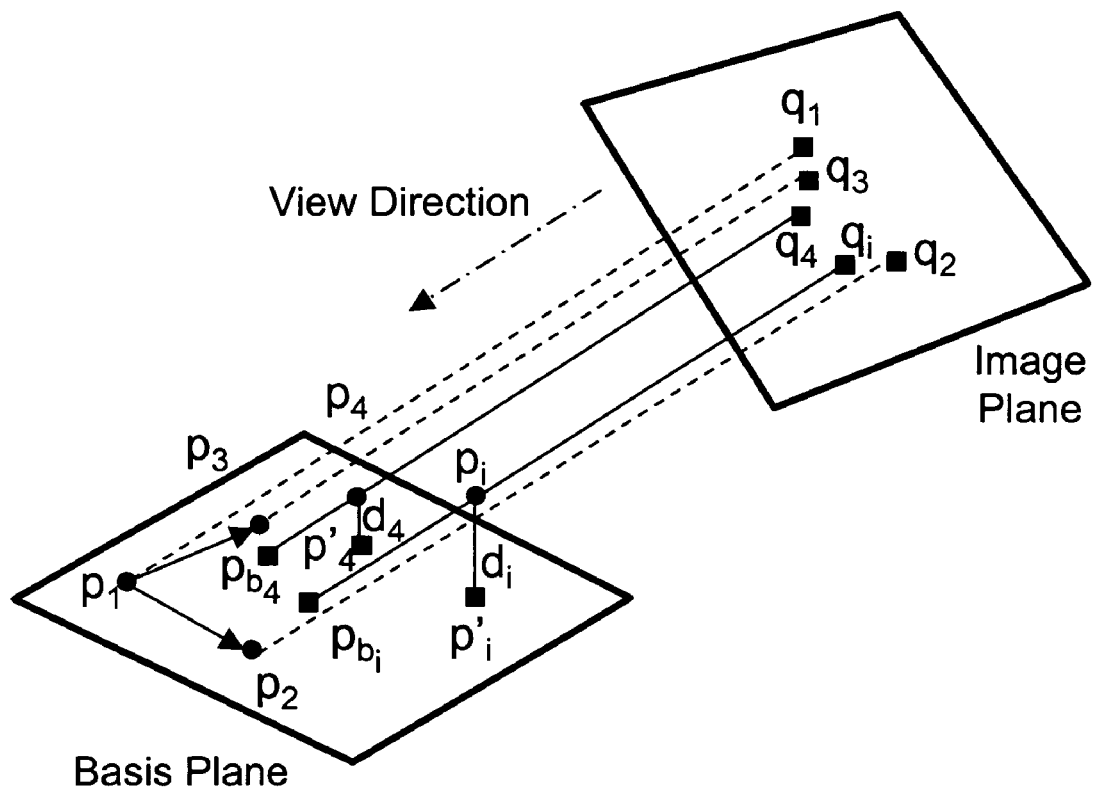
FIG. 3 is shows the paraperspective camera model, which is approximated as the orthographic projection of points to a plane, followed by an affine transformation.

Jacobs in "The Space Requirements of Indexing Under Perspective Projection", IEEE Trans. on Pattern Analysis and Machine Intelligence, vol. 18, no. 3, pp. 330-333, 1996, simplifies the camera projection model as an orthographic projection into a plane followed by an affine transform of these (projected) points. For a set of points $(P_1, P_2, \ldots, P_n)$ in the 3D space, a hypothetical plane passing through points $P_1$, $P_2$ and $P_3$ can be constructed. This is called as the basis plane, as in FIG. 3. The point $P_4$ is projected perpendicularly into the basis plane, and we call this projected point as $p_4'$. The affine coordinates of $p_4'$ with respect to the basis $(P_1, P_2, P_3)$ are $(a_4, b_4)$. Similarly, for the ith point $P_i$, its projection on the basis plane is $p_i'$, with affine coordinates $(a_i, b_i)$. Parameters $d_4$ and $d_i$ are the distances of points $P_4$ and $P_i$ from the basis plane, respectively.

For affine coordinates $(\alpha_4, \beta_4)$ it can be shown that there is a viewpoint in which the projection of the point $P_4$ has those affine coordinates. The point $p_{b4}$ lies on the basis plane with affine coordinates $(\alpha_4, \beta_4)$ for the basis $(P_1, P_2, P_3)$. The line passing through $p_{b4}$ and $P_4$ sets this viewing direction. This line meets the image plane (whose normal is parallel to the line) at a point $q_4$. That is, $q_4$ is the image of $P_4$. In a similar manner, $P_1$, $P_2$, $P_3$ are projected into $q_1$, $q_2$ and $q_3$, respectively on this image plane. With $(q_1, q_2, q_3)$ as the basis, one can easily observe that $q_4$ has the affine coordinates $(\alpha_4, \beta_4)$, even when we subject the points on the image plane to an affine transformation (which includes translation, rotation, and scaling, to name a few).

The affine coordinates $(\alpha_i, \beta_i)$ of the projections of the remaining points (for this given view direction) are computed next as functions of $(\alpha_4, \beta_4)$. Let $p_{bi}$ be the intersection point of the basis plane and the ray parallel to the viewing direction and passing through $P_i$. Let $q_i$ be its projection on the image plane. As before, both $p_{bi}$ and $q_i$ have the affine coordinates $(\alpha_i, \beta_i)$ when the basis chosen are $(P_1, P_2, P_3)$ and $(q_1, q_2, q_3)$, respectively. Using similar triangles $P_4 p_{b4} p_4'$ and $P_i p_{bi} p_i'$ we have:

$$p_{bi} - p_i = \frac{d_i}{d_4}(p_{b4} - p_4)$$

In terms of the α affine coordinates, we express the above equation as:

$$\alpha_i = a_i + \frac{d_i}{d_4}(\alpha_4 - a_4)$$

Figure 4:
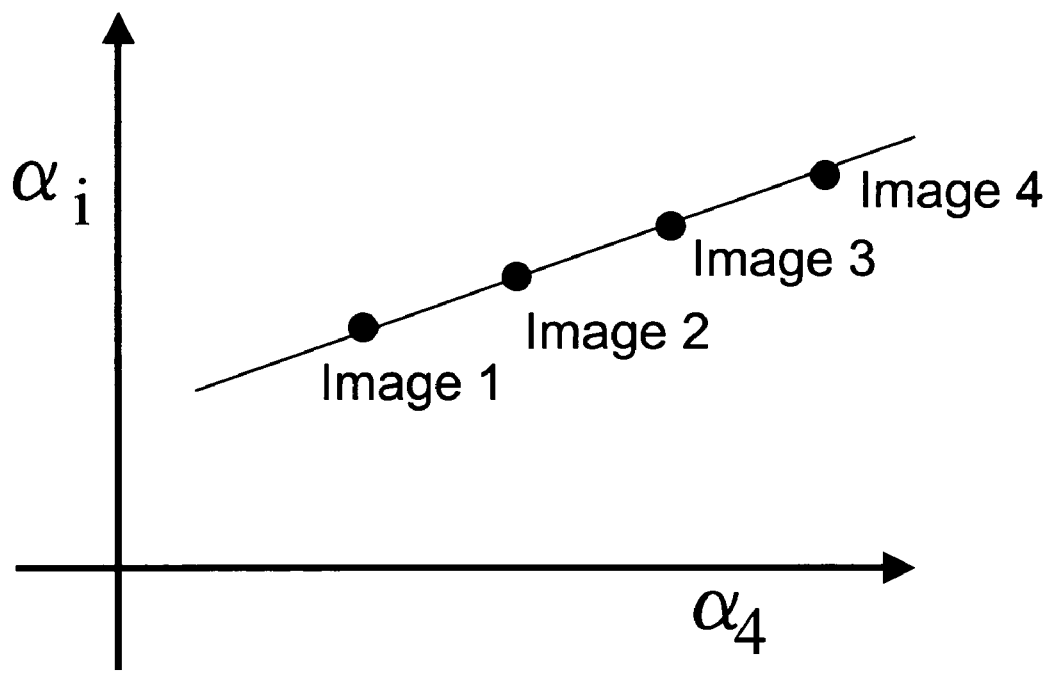
FIG. 4 is a graph for the plot of (a4, ai) over all possible images, which leads to a straight line.

A similar equation can be written for the β coordinate values. The slope of the β coordinate values is the same as that for the α affine coordinates as in FIG. 4

Note that $a_4$, $a_i$, $d_i$ and $d_4$ are constant over all possible images that can be generated for the given set of 3D points. Thus, for every possible image generated for $(P_1, P_2, \ldots, P_n)$ the plot of $(\alpha_4, \alpha_i)$ is a straight line with a slope $d_i/d_4$. The straight line passes through the points $(a_4, a_i)$ that is independent of the camera parameters, and depends solely on the 3D geometry of the points. The slope of the line is indicative of how far $P_i$ is from the basis plane. This property will be next to estimate the structure of the human face from multiple images. Also if the equation of the affine lines are determined, then given a "target" image where we have identified the location of the projection of $(P_1, P_2, P_3, P_4)$, the projection of the ith point $P_i$ in this image can be identified by computing $(a_i, b_i)$, using the equation of the affine lines. Repeating this for all values of i will generate the novel view of the face synthetically.

Figure 5:
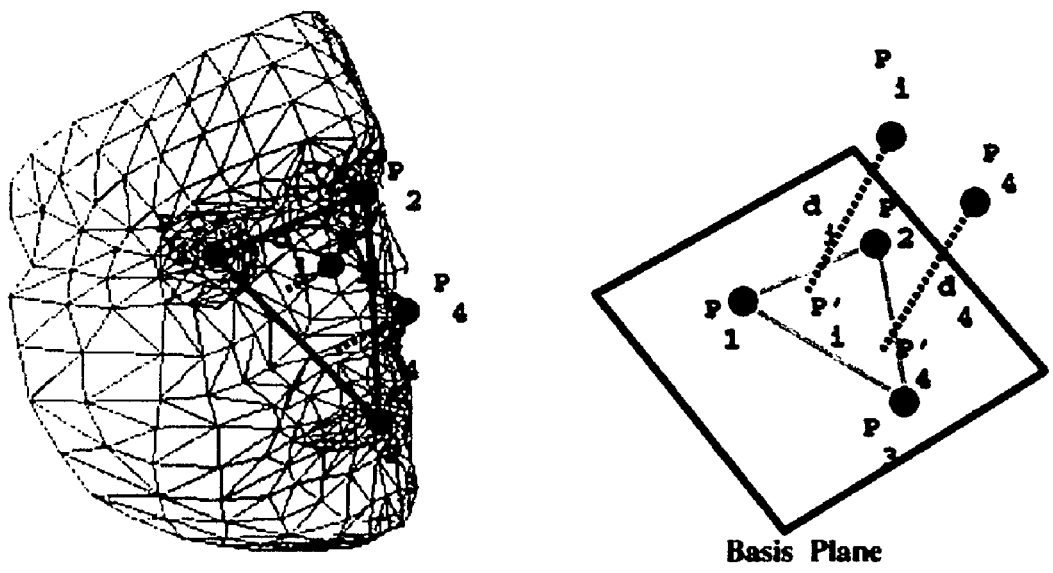
FIG. 5 shows the four landmarks on the face model, the hypothetical basis plane, and the perpendicular projections of the fourth and the ith point.

The facial feature extraction stage located the four important landmarks on the human face: the location of the eyes, nose and the mouth. Assume that the three point features (the center of the two eyes and the mouth) forms the basis, and we call them $P_1$, $P_2$ and $P_3$, respectively. The imaginary plane passing through these points is called the basis plane. The tip of the nose is the fourth point, $P_4$. These points are illustrated for the 3-D face model ias in FIG. 5. Let, $d_4$ be the perpendicular distance of from the basis plane. Let $P_i'$ be a point on the basis plane. Its affine coordinate values are $(a_i, b_i)$, with $(P_1, P_2, P_3)$ as the basis. If we draw a line emanating from this point and perpendicular to the basis plane, lets assume that it intersects the face model at $P_i$. Also, let $|P_i P_i'|=d_i$. Thus, given a generic 3-D CAD model of the face, we map its eyes, nose and mouth position to these features identified in the 2-D image. The task in the face modeling stage is to estimate $d_i$, for the i th point on the mesh. This is repeated for all values of i.

In the kth image ($k=1, \ldots, N_f$), let the image of point $P_1$ be $q_1^k$, and so on. Consider $(q_1^k, q_2^k, q_3^k)$ as the basis. From the earlier section, it is known that, for any para perspective projection of five 3-D points $(P_1, P_2, P_3, P_4, P_i)$, the affine coordinates of the projection of $P_4$ is related to that of the projection of $P_i$ by the equation $$\alpha_i^k = a_i + \frac{d_i}{d_4}(\alpha_4 - a_4)$$

where $(\alpha_i^k, \beta_i^k)$ are the affine coordinates of the projection of $P_i$ in the kth view, and so on.

The right hand side of the equation is only a function of the unknown parameter $s_i = d_i/d_4$, which we formally call the depth ratio. Here, $a_4$ is known and is a race and gender dependent constant. The $\beta_i^k$ component can be estimated similarly as a function of $s_i$. Next, we compute $(x_i^k(s_i), y_i^k(s_i))$, the image coordinate values in the kth frame. The average sum of the squared difference measure of the intensity as a function of $s_i$, computed over every image pair chosen, is defined as follows.

$$SSD(s_i) = \frac{2}{N_f(N_f-1)} \sum_{k=1}^{N_f-1} \sum_{l=k+1}^{N_f} DIFF(win(k, x_i^k, y_i^k, w), win(l, x_i^k, y_i^k, w))$$

Here $win(k, x_i^k, y_i^k, w)$ is a window of size wxw selected in the kth image around the point $(x_i^k, y_i^k)$. Also, DIFF(.) is the sum of the squared difference computed for the window pair.

The estimated value $s_i$ is the one for which $SSD(s_i)$ is minimum. Theoretically, one has to search from $[-\infty, \infty]$. In the system the search is constrained as follows. After the 3D model is fitted to the face for the ith point, if the depth ratio according to this generic model is $s_i^0$, then we search in the neighborhood of this value. The search can typically be constrained in the neighborhood of $s_i^0$.

Figure 6:
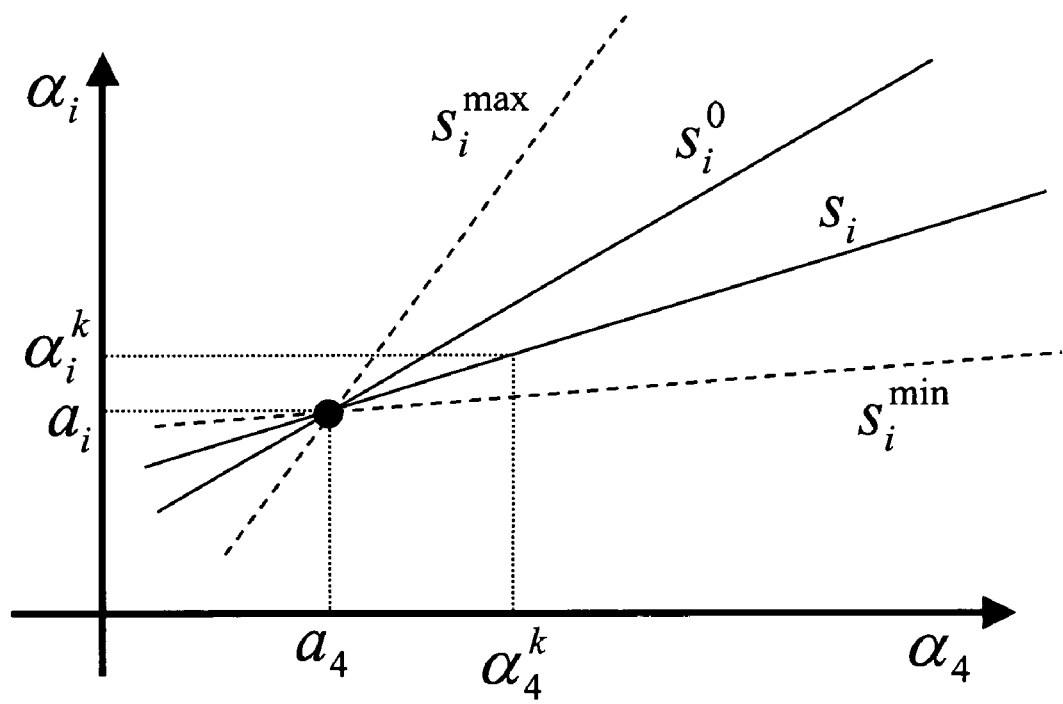
FIG. 6 shows the plot of a4 vs. ai, which is a straight line passing through (a4, ai), for a chosen value of the depth ratio.

The depth ratio estimation process can be interpreted graphically as in FIG. 6. The straight line corresponding to the $a_4$ vs. a; plot always passes through the point $(a_4, a_1)$, and the slope of the line is the unknown parameter $s_i$ we seek to estimate. The slope is varied over a range of values. For a particular setting of the slope value, $a_i^k$ for a given $a_4^k$ is generated. The depth ratio estimation process is repeated for a dense set of points on the basis plane with affine coordinates $(a_i, b_i)$, following the steps discussed earlier. The next issue is to obtain the Euclidean coordinate values of the ith point starting from the parameters $(a_i, b_i, s_i)$, which we refer to as the affine structure of $P_i$.

With the knowledge of the Euclidean geometry of certain reference points, such as distances and angle values, it is possible to estimate Euclidean structure of all the points on the mesh by minimizing a penalty function. For face modeling application, the Euclidean coordinate values of the template model's eyes, nose and mouth position are used, from which the Euclidean structure of the subject's face is generated. Next, using the texture from one of the input images, the face can be rendered for different pitch and yaw values (i.e., rotation in x- and y-axis).

The final system allows the derivation of anthropometric measurements from facial photographs taken in uncontrolled or poorly controlled conditions of resolution, pose angle, and illumination.

What is claimed is:

1. A method for face modeling, comprising the steps of:
   (a) processing face detection and facial feature detection on a plurality of images for a person with a single or a plurality of image capturing systems,
   (b) locating four landmarks on the face of the person based on the facial feature detection,
   wherein the face is detected by the face detection, and
   wherein three point features from the four landmarks form a basis plane,
   (c) training support vector machine (SVM) based demographic classifiers with between one and two thousand images as an input at a learning phase,
   (d) processing said plurality of images to obtain demographic recognition of the person in the captured images using the support vector machine (SVM) based demographic classifiers,
   (e) choosing a face model specific to the demographic recognition of the person as an approximate face model, whereby calculation of affine coordinates using demographic dependent constant can be facilitated by the chosen approximate face model, and (f) combining said demographic recognition with affine coordinate based mesh adjustment technique for said face modeling, wherein said demographic recognition comprises gender and ethnicity recognition, and whereby the face modeling is followed by a view generation of the face using rendering tools.

2. The method according to claim 1, wherein the method further comprises a step of using affine lines and their slope adjustment, which is proportional to depth of the point, for model estimation.

3. The method according to claim 1, wherein the method further comprises a step of using the affine line properties for re-projecting a matched pair in two images to a third image, once four facial landmarks are located in all of the three images.

4. The method according to claim 1, wherein the method further comprises a step of using a single view to crudely model the face based on gender and ethnicity and then use anthropometric measures for identification.

5. The method according to claim 1, wherein the method further comprises a step of using multiple views to model the face in the image based on the combination of the demographics and the affine line properties and then use the anthropometric measures for identification purposes.

6. An apparatus for face modeling, comprising:

(a) a single or a plurality of image capturing means directed at a person, (a) means for processing face detection and facial feature detection on a plurality of images for the person, (b) means for locating four landmarks on the face of the person based on the facial feature detection, wherein the face is detected by the face detection, and wherein three point features from the four landmarks form a basis plane, (c) means for training support vector machine (SVM) based demographic classifiers with between one and two thousand images as an input at a learning phase, (d) a processing means for recognizing demographics from at least an image, (e) a selection means that chooses a face model specific to the demographic recognition of the person as an approximate face model, whereby calculation of affine coordinates using demographic dependent constant can be facilitated by the chosen approximate face model, (f) a processing means for combining the demographics recognition with affine coordinate based mesh adjustment technique for said face modeling, and (g) at least a rendering tool for a view generation of the face, wherein the demographics recognition comprises gender and ethnicity recognition.

7. The apparatus of claim 6, wherein the apparatus further comprises means for using said affine lines and their slope adjustment, which is proportional to depth of the point, for model estimation.

8. The apparatus of claim 6, wherein the apparatus further comprises means for using the affine line properties for re-projecting a matched pair in two images to a third image, once four facial landmarks are located in all of the three images.

9. The apparatus of claim 6, wherein the apparatus further comprises means for using a single view to crudely model the face in the image based on the gender and ethnicity and then use anthropometric measures for identification.

10. The apparatus of claim 6, wherein the apparatus further comprises means for using multiple views to model the face in the image based on the combination of the demographics and the affine line properties and then use the anthropometric measures for identification purposes.

* * * * *